US012589610B2

(12) United States Patent
Voerman

(10) Patent No.: US 12,589,610 B2
(45) Date of Patent: Mar. 31, 2026

(54) SEALING MARK, A PACKAGE AND METHODS

(71) Applicant: JustRule I.P. B.V., Middelburg (NL)

(72) Inventor: Roelof Voerman, Middelburg (NL)

(73) Assignee: JustRule I.P. B.V., Middelburg (NL)

( * ) Notice: Subject to any disclaimer, the term of this patent is extended or adjusted under 35 U.S.C. 154(b) by 0 days.

(21) Appl. No.: 18/847,828

(22) PCT Filed: Mar. 17, 2023

(86) PCT No.: PCT/NL2023/050137

§ 371 (c)(1),
(2) Date: Sep. 17, 2024

(87) PCT Pub. No.: WO2023/177297

PCT Pub. Date: Sep. 21, 2023

(65) Prior Publication Data

US 2025/0196525 A1 Jun. 19, 2025

(30) Foreign Application Priority Data

Mar. 18, 2022 (NL) ..................................... 2031320

(51) Int. Cl.
*B42D 25/328* (2014.01)
*B42D 25/378* (2014.01)

(52) U.S. Cl.
CPC ......... *B42D 25/328* (2014.10); *B42D 25/378* (2014.10)

(58) Field of Classification Search
CPC ............................ B42D 25/328; B42D 25/378
USPC ........ 283/67, 70, 72, 74, 81, 82, 86, 94, 98, 283/99, 100, 105, 107, 901
See application file for complete search history.

(56) References Cited

U.S. PATENT DOCUMENTS

| | | | | |
|---|---|---|---|---|
| 2,826,073 | A | 3/1958 | Huyck et al. | |
| 7,316,422 | B1 | 1/2008 | Schmitz | |
| 10,302,570 | B2 | 5/2019 | Joo | |
| 2005/0179548 | A1* | 8/2005 | Kittel | G08B 13/1445 340/568.2 |
| 2006/0275671 | A1 | 12/2006 | Eto et al. | |
| 2011/0019283 | A1 | 1/2011 | Steenblik et al. | |
| 2017/0305630 | A1 | 10/2017 | Miller | |
| 2022/0080763 | A1* | 3/2022 | Smith | C09D 11/50 |

FOREIGN PATENT DOCUMENTS

| | | | |
|---|---|---|---|
| DE | 2842972 | A1 | 3/1980 |
| DE | 19941295 | A1 | 3/2001 |
| DE | 102006019557 | A1 | 12/2007 |
| EP | 1798026 | A1 | 6/2007 |
| EP | 1798707 | A2 | 6/2007 |
| GB | 2373338 | A | 9/2002 |
| KR | 20200059561 | A | 5/2020 |

(Continued)

*Primary Examiner* — Justin V Lewis
(74) *Attorney, Agent, or Firm* — Daniel A. Thomson; Emerson, Thomson & Bennett

(57) ABSTRACT

The invention relates to a sealing mark for sealing a package such as for packing medicaments. The sealing mark has a sealing layer and a hologram layer that at least partly covers the sealing layer. The sealing mark further comprises a thermosensitive layer that at least partly covers the hologram layer and/or the sealing layer. The thermosensitive layer includes thermochromic ink. The thermochromic ink is irreversible.

16 Claims, 6 Drawing Sheets

(56) References Cited

FOREIGN PATENT DOCUMENTS

| | | | |
|---|---|---|---|
| WO | 1991018377 | A2 | 11/1991 |
| WO | 1992001975 | A1 | 2/1992 |
| WO | 1999045513 | A1 | 9/1999 |
| WO | 2001004221 | A1 | 1/2001 |
| WO | 2008144349 | A1 | 11/2008 |
| WO | 2010060812 | A1 | 6/2010 |
| WO | 2013101586 | A2 | 7/2013 |
| WO | 2013101592 | A1 | 7/2013 |
| WO | 2015036045 | A1 | 3/2015 |
| WO | 2016008553 | A1 | 1/2016 |
| WO | 2017069511 | A1 | 4/2017 |

* cited by examiner

SEALING MARK, A PACKAGE AND METHODS

The invention relates to a sealing mark for sealing a package.

Sealing marks are known, e.g., from International patent application WO 99/45513, disclosing an identification mark having an optical marking and a magnetic marking. The optical marking may comprise a hologram, while the magnetic marking may include a soft magnetic material. Sealing marks are used for securing articles.

Further, sealing marks may be applied to seal packages containing medicaments, e.g., for securing authenticity.

It appears, in practice, some articles contained in packages are vulnerable to heat, especially consumable articles such as medicaments.

It is an object of the present invention to provide a sealing mark signaling that a temperature value has been passed. Therefore, according to the invention, a sealing mark for sealing a package is provided, the sealing mark comprising a sealing layer and a hologram layer at least partly covering the sealing layer, the sealing mark further comprising a thermosensitive layer at least partly covering the hologram layer and/or the sealing layer, wherein the thermosensitive layer includes thermochromic ink, and wherein the thermochromic ink is irreversible.

By applying a thermosensitive layer including thermochromic ink, a temperature passing a temperature threshold may easily be detected, as the colour of the ink changes, thereby signaling to a user of the sealed package that the temperature threshold has been passed. Then, the user is informed that the article contained in the package may have changed, rendering it less suitable for consumption. The thermochromic ink is irreversible such that the change in colour after passing the temperature threshold is permanent, informing the user of the sealed package that the temperature threshold has been passed, even if the temperature has returned to acceptable values.

Advantageously, the thermochromic ink is selected to change colour upon reaching a pre-determined temperature level, e.g., circa 35 or 37 degrees Celsius. The thermochromic ink may be selected to change color if the temperature rises above the pre-determined temperature level, from a temperature range below the pre-determined temperature level. In principle, the thermochromic ink may also be selected to change color if the temperature drops below a pre-determined temperature level, e.g. circa 0 degrees Celsius, from a temperature range above the pre-determined temperature level. The pre-determined temperature level or temperature threshold may be chosen at levels other than circa 35 or circa 37 degrees Celsius, e.g., as high as circa 60 degrees and as low as circa minus 10 degrees Celsius. The pre-determined temperature level may be higher than circa 35 degrees Celsius or circa 37 degrees Celsius, e.g. circa 40 degrees Celsius or circa 50 degrees Celsius or circa 60 degrees Celsius. Also, the pre-determined temperature level may be lower than circa 35 degrees Celsius, e.g. circa 30 degrees Celsius or circa 25 degrees Celsius or circa 20 degrees Celsius, or even lower, e.g. circa 10 degrees Celsius, circa 4 or 5 degrees Celsius, or circa 0 degrees Celsius or circa minus 10 degrees Celsius.

In an exemplary embodiment, the ink is selected to change color if the temperature rises above circa 20 degrees Celsius, or above any other pre-determined temperature level mentioned above.

In another exemplary embodiment, the ink is selected to change color if the temperature drops below circa 0 degrees Celsius, or below any other pre-determined temperature level mentioned above.

In yet a further exemplary embodiment, the ink is selected to change color if the temperature rises above a first pre-determined temperature level, e.g. any of the pre-determined temperature levels mentioned above such as circa 20 degrees Celsius, while the ink is also selected to change color if the temperature drops below a second pre-determined temperature level, e.g. any of the pre-determined temperature levels mentioned above but below the first pre-determined temperature level above, such as 0 degrees Celsius. Then, the ink is selected to change color if the temperature deviates from a selected temperature range that is bounded by an upper level, the first pre-determined temperature level, and by a lower level, the second pre-determined temperature level.

By providing the sealing mark with a perforation line to be aligned with a closing structure of the package to be sealed, the sealing mark may be easily broken so as to open the package. This has the added benefit of rendering the sealing mark invalid when the seal is broken, i.e., when the package is opened or used.

Moreover, the invention relates to a package for packing an article such as a medicament.

The invention also relates to a method of sealing a package.

The invention further relates to a method of unsealing a package.

Further advantageous embodiments according to the invention are described in the following claims.

It should be noted that the technical features described above or below may each on its own be embodied in a sealing mark and/or in a method, i.e., isolated from the context in which it is described, separate from some or all of the other features, or in combination with only a number of the other features described in the context in which it is disclosed. Each of these features may further be combined with any other feature disclosed, in any combination.

The invention will be further elucidated on the basis of exemplary embodiments which are represented in the drawings. The exemplary embodiments are given by way of non-limitative illustrations of the invention. In the drawings.

Parts that are identical or corresponding between figures are represented with the same reference numerals in each figure. The drawings are only schematic representations of embodiments of the invention.

Figure 1:
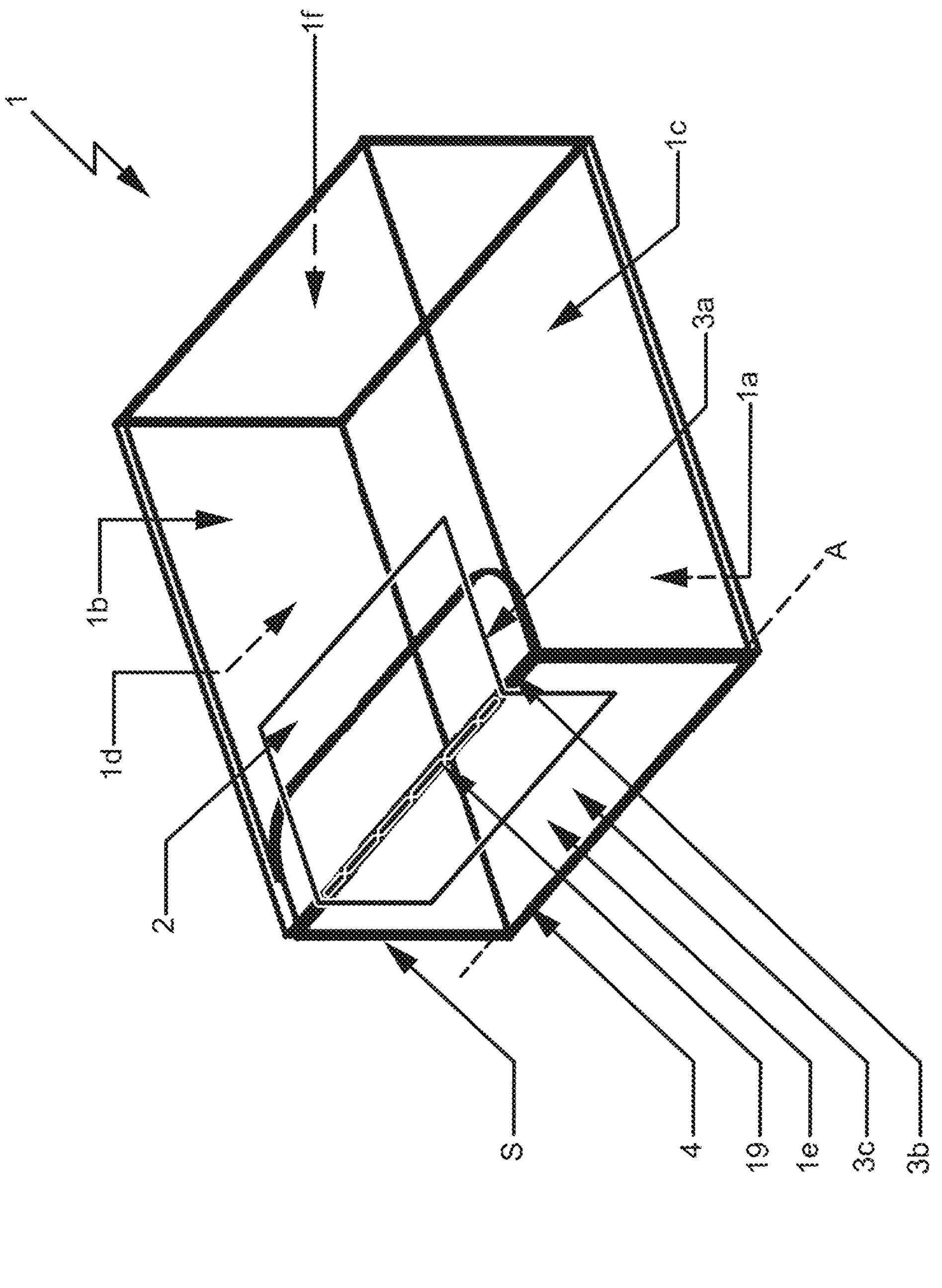
FIG. 1 shows a schematic perspective view of a package according to the state of the art.

FIG. 1 shows a schematic perspective view of a package 1 according to the state of the art. The package 1 may be used for packing an article such as a medicament. The package 1 is box-shaped and made from a paper material such as paper or cardboard. However, other materials can also be used as base material for forming the package 1, such as a plastic or a mixture of natural and/or synthetic materials.

Further, the package 1 may have another shape, e.g., a mainly cylindrical shape such as a bottle or so-called medical tube closed by a cap. The shown package 1 has a bottom 1*a*, a top 1*b*, a first side wall 1*c*, a second side wall 1*d*, opposite to the first side wall 1*c*, a front wall 1*e* and a back wall 1*f*. The package 1 further has a closing structure 3 including a cover end portion 3*a* and a cover main portion 3*c* connected to the cover end portion 3*a* via a folding line 3*b*. The cover main portion 3*c* is connected to the bottom 1*a* of the package 1 via a hinge 4. In a closed position, the closing structure 3 covers an opening of the package 1 so as to close the package 1. In the shown embodiment, the opening is formed at a side facing outwardly from the front wall 1*e* of the package. Then, the cover main portion 3*c* forms at least a portion of the front wall 1*e* of the package 1. In other embodiments, the opening may be formed at other sides of the package 1. In order to open the package 1, the closing structure 3 may be swiveled in a swiveling direction S relative to a swiveling axis A that coincides with the hinge 4, thereby exposing the opening of the package 1 at the front side thereof, so as to provide access to the interior of the package 1. Generally, in a process of opening the package 1, the closing structure is moved e.g., including a tilting movement, a shifting movement and/or any superposition of movements to uncover the opening of the package 1.

As shown in FIG. 1, the package 1 is sealed using a sealing mark 2, placed on at least a portion of the closing structure 3 for sealing the closing structure 3, in the closed position of the package 1. The sealing mark 2 is also attached to the top 1*b* of the package 1 to keep the closing structure 3 in the closed position. Generally, the sealing mark 2 is attached to both the closing structure 3 and a stationary portion of the package 1 for securing a closed state of the package 1. The stationary portion of the package 1 may include a portion such as a wall that has a fixed position and orientation relative to other portions of the package, also during opening or closing the package opening. The sealing mark 2 includes a sealing layer sealing the package opening.

Figure 2:
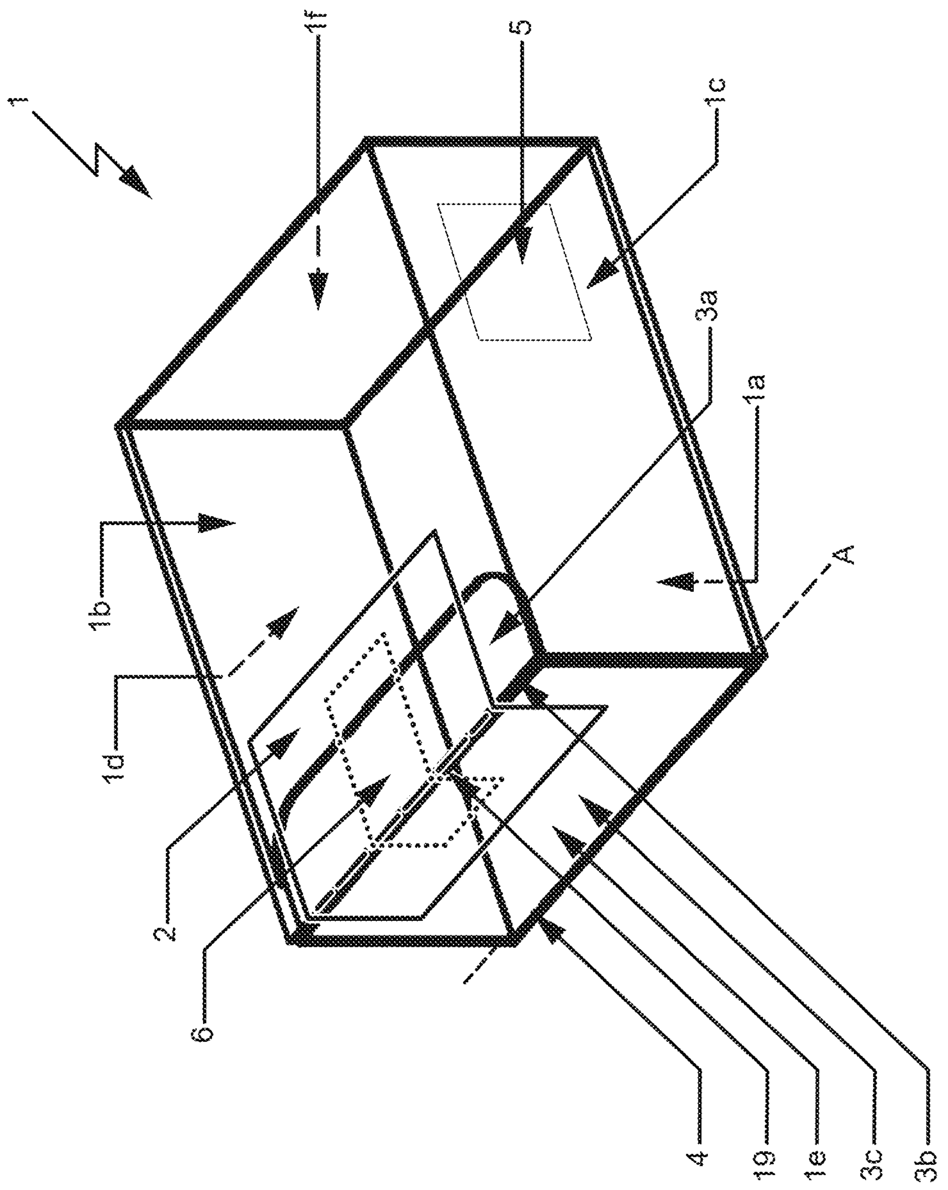
FIG. 2 shows a schematic perspective view of a package according to a first embodiment of the invention.

FIG. 2 shows a schematic perspective view of a package 1 according to a first embodiment of the invention. Again, the package 1 has a structure that is mainly similar to the state of the art package 1 shown in FIG. 1. According to an aspect of the invention, the sealing mark 2 has a thermosensitive layer 6 including a thermochromic ink. In the shown embodiment, the thermosensitive layer 6 is located on top of the sealing mark 2 described referring to FIG. 1. The package 1 further includes an optional identification code 5 printed on the first side wall 1*c* of the package 1, e.g., a one dimensional code such as a bar code or a two dimensional code such as a QR code, for identification of the package 1. The identification code may be directly printed on the package wall 1*c* or on a print layer attached to the package. The identification code may, alternatively, be located on another wall, top or bottom of the package 1. Further, the package 1 may be provided without the identification code 5.

Figure 3:
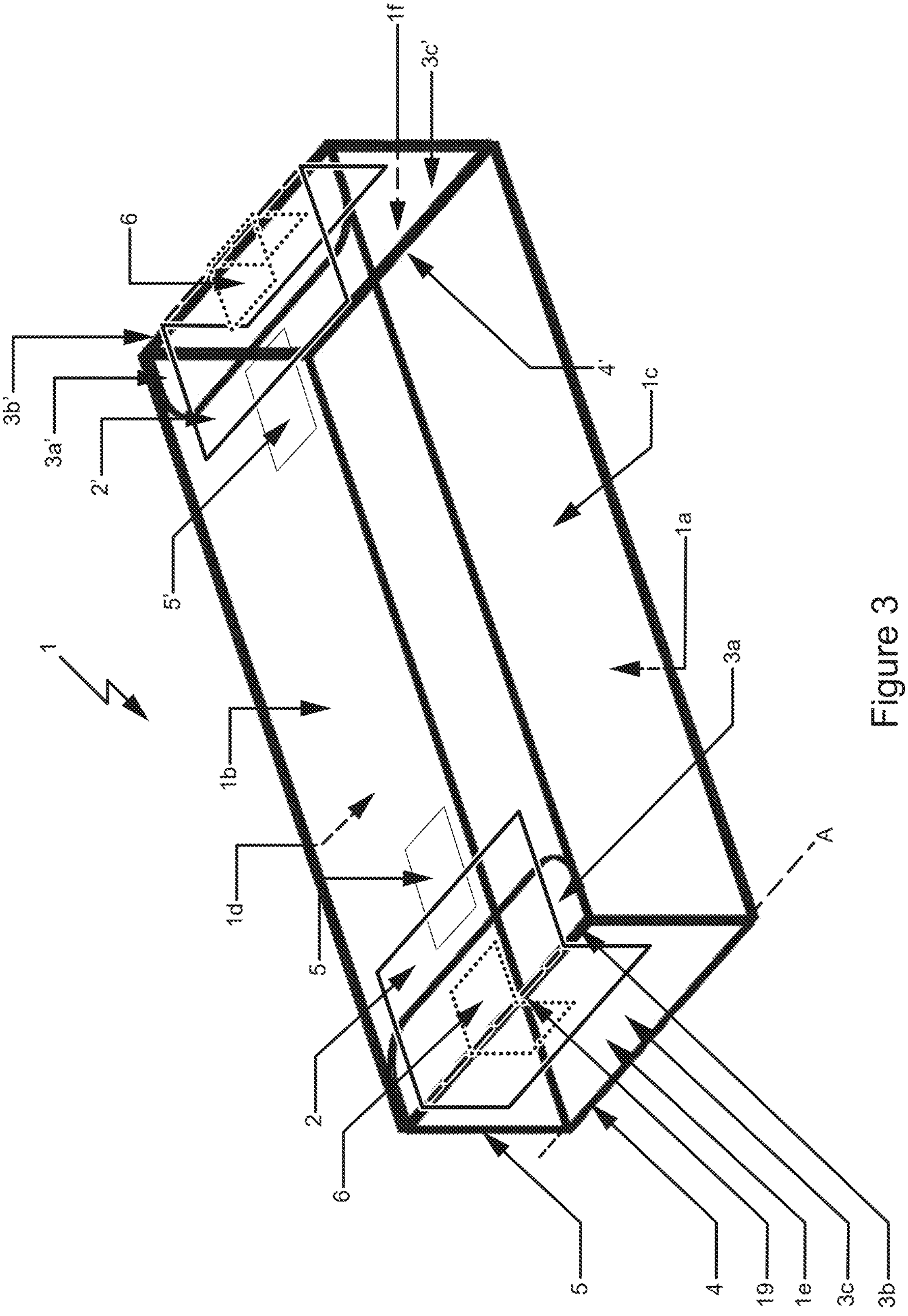
FIG. 3 shows a schematic perspective view of a package according to a second embodiment of the invention.

FIG. 3 shows a schematic perspective view of a package 1 according to a second embodiment of the invention. The package 1 has a structure that is mainly similar to the one shown in FIG. 1, however provided with two closing structures 3, 3' opposite to each other and closing respective openings of the package 1. Both closing structures 3, 3' have been sealed by respective sealing marks 2, 2' according to an aspect of the invention.

It is noted that, in principle, the package 1 may include more than two closing structures, e.g., three or four closing structures, each of them being sealed by a sealing mark.

It is further noted that the closing structure may have an alternative geometry, e.g., cap geometry closing an opening of a cylindrical shaped package.

In the embodiment shown in FIG. 3, two identification codes 5, 5' either directly printed or printed on a respective print layer partly cover corresponding sealing marks 2, 2'.

Figure 4:
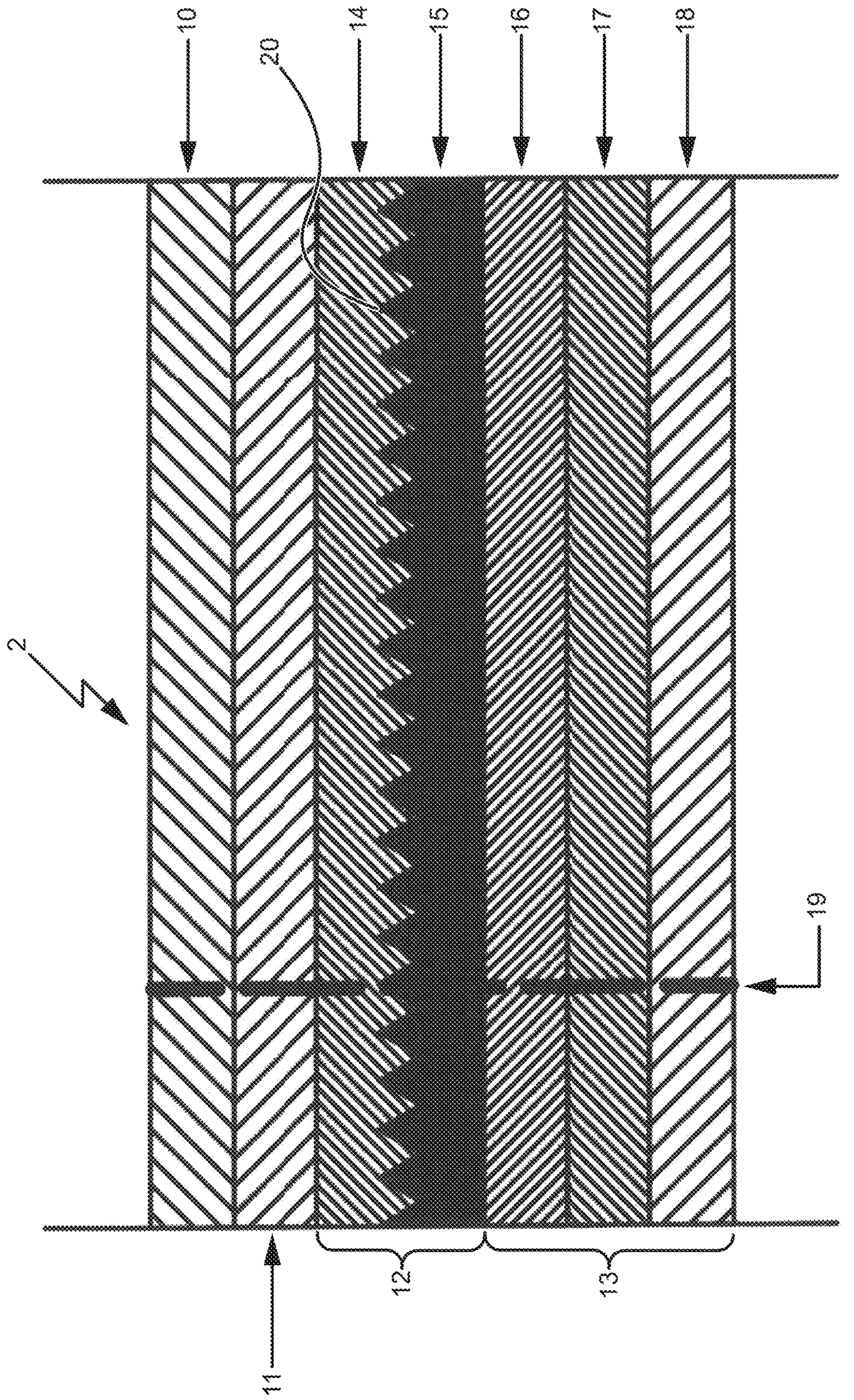
FIG. 4 shows a schematic cross-sectional view of a seal mark according to the invention.

FIG. 4 shows a schematic cross-sectional view of a sealing mark 2 according to the invention. The sealing mark 2 has a first packet of layers 12 forming a hologram and a second packet of layers 13 forming a magnetizable structure. The hologram or hologram layer 12 is placed on top of the magnetizable structure 13. The hologram 12 can be optically read, e.g., via an optical reading system, and can be used as an optical authenticity marking. Generally, the hologram layer 12 may include optically readable elements 20. The information represented by the optically readable elements 20 may be encoded. Also the magnetizable structure 13 can be used for authentication, or, more generally, for providing information of the article contained in the package, such as end of life information, an identification code, or for securing the article. The magnetizable structure 13 may be magnetically (de)activatable. As an example, the information may include an identification code and/or manufacturing data of the article. In the shown embodiment, the first packet of layers 12 includes, from top to bottom, a coating layer 14 including optical elements representing holographic information, and a base layer 15, e.g., an aluminum layer, carrying the coating layer 14. Similarly, in the shown embodiment, the second packet of layers 13 includes, from top to bottom, a carrier layer 16, e.g., a PET layer, for carrying the hologram 12, a magnetizable layer 17, and an adhesive layer 18, for attaching the sealing mark 2 to the package 1. The adhesive layer 18 may also be realized as a hot stamping foil HSF and forms a base layer attaching the sealing mark 2 to the package 1. The hologram layer 12 completely or at least partially covers the sealing layer 18.

Further, the sealing mark 2 includes a top layer 10 including thermochromic ink, the top layer 10 at least partly covering the hologram 12. In the shown embodiment, the sealing mark 2 includes an intermediate glue layer 11 sandwiched between the hologram layer 12 and the top layer 10. Alternatively, the top layer 10 may be placed directly on the hologram layer 12.

In the shown embodiment, the sealing layer is formed by the magnetizable structure or second packet of layer 13. In another variant, another structure is formed on the base layer 18 attaching the sealing mark to the package. As an example, an RFID structure may be formed on the base layer 18, the second packet of layer 13 with the RFID structure then forming the sealing layer. Further, no specific structure may be formed on the base layer 18. Then, the base layer 18 forms the sealing layer on which the hologram layer 12 is located. It is noted that, alternatively, further layers may be applied, e.g., between the sealing layer 18 and the hologram layer 12, or between the sealing layer 18 and the thermosensitive layer 10. The sealing layer 18 at least includes the base layer for attaching the sealing mark 2 to the package 1. The hologram layer 12 at least partly covers the sealing layer.

Generally, the thermosensitive layer 10 at least partly covers the hologram layer 12 and/or the sealing layer 13. As a first example, the thermosensitive layer 10 at least partly covers the hologram layer 12 such that at least a portion of the hologram layer 12 is covered by the thermosensitive layer 10. As a second example, the thermosensitive layer 10 at least partly covers the sealing layer 13 such that at least a portion of the sealing layer 13 is covered by the thermosensitive layer 10. Then, the thermosensitive layer 10 may be located next to the hologram layer 12, both the thermosensitive layer 10 and the hologram layer 12 being located above the sealing layer 13. As a third example, the thermosensitive layer 10 at least partly covers both the hologram layer 12 and the sealing layer 13, such that for example a portion of the hologram layer 12 is covered by the thermosensitive layer 10 as well as a portion of the sealing layer 13 that is not covered by the hologram layer 12. Then, the thermosensitive layer 10 may be located on top of the hologram layer 12 and/or the sealing layer. Then, the thermosensitive layer 10 may form a top layer. Generally, any combination of layers partially covering each other may be applied. The thermochromic ink is selected to change colour upon reaching a pre-determined temperature level such as circa 35 degrees Celsius, or more or less than circa 35 degrees Celsius, e.g. circa 37 degrees Celsius. Then, the ink changes color when an actual temperature rises from a temperature range below the pre-determined temperature level to said pre-determined temperature level. As an example, the thermochromic ink may change from e.g. black or grey into e.g. white or yellow, or vice versa. Or from e.g. blue, green or red into e.g. violet, orange or purple, or the other way around. Apparently, other colour changes of the thermochromic ink may occur upon reaching the pre-determined colour, e.g. in terms of spectral, hue, saturation, brightness and/or gloss. Then, a user of the package is informed that the package 1 has reached the pre-determined temperature level, which might indicate expiry or other effects of the article contained in the package 1.

Advantageously, the thermochromic ink is irreversible, so that the user is informed that, at some time, the package 1 has reached said pre-determined temperature level.

The top layer 10 including the thermochromic ink may be realized on the hologram layer 12 using at least one of: a printing process, a stamping process, a laser process, an engraving process or a depositing process.

Typically, also referring to FIG. 1, the sealing layer 18 is provided with a perforation line 19 to be aligned with a closing structure 3 of the package 1 to be sealed, for facilitating the breaking of the sealing mark 2.

Figure 5:
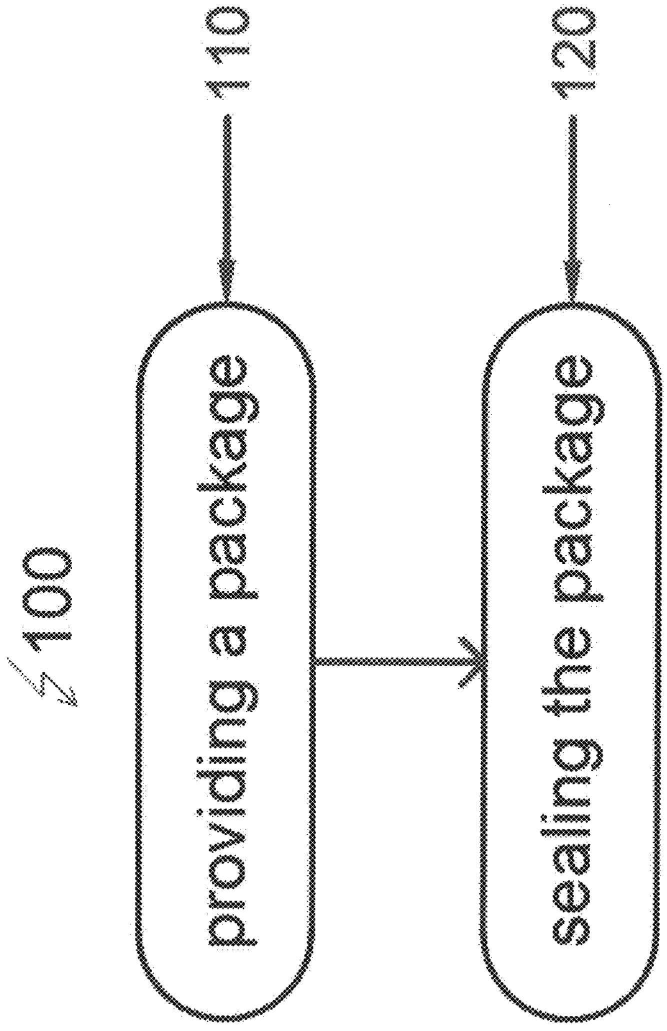
FIG. 5 shows a flow chart of a method of sealing a package according to the invention.

FIG. 5 shows a flow chart of a method 100 according to the invention. The method 100 is used for sealing a package such as a package for packing an article such as a medicament. The method 100 comprises a step of providing 110 a package 1 for packaging an article such as medicine, and a step of sealing 120 the package 1 using a sealing mark 2 as described above. The method 100 may be applied after placing the article in the package 1 and/or closing the package 1.

Figure 6:
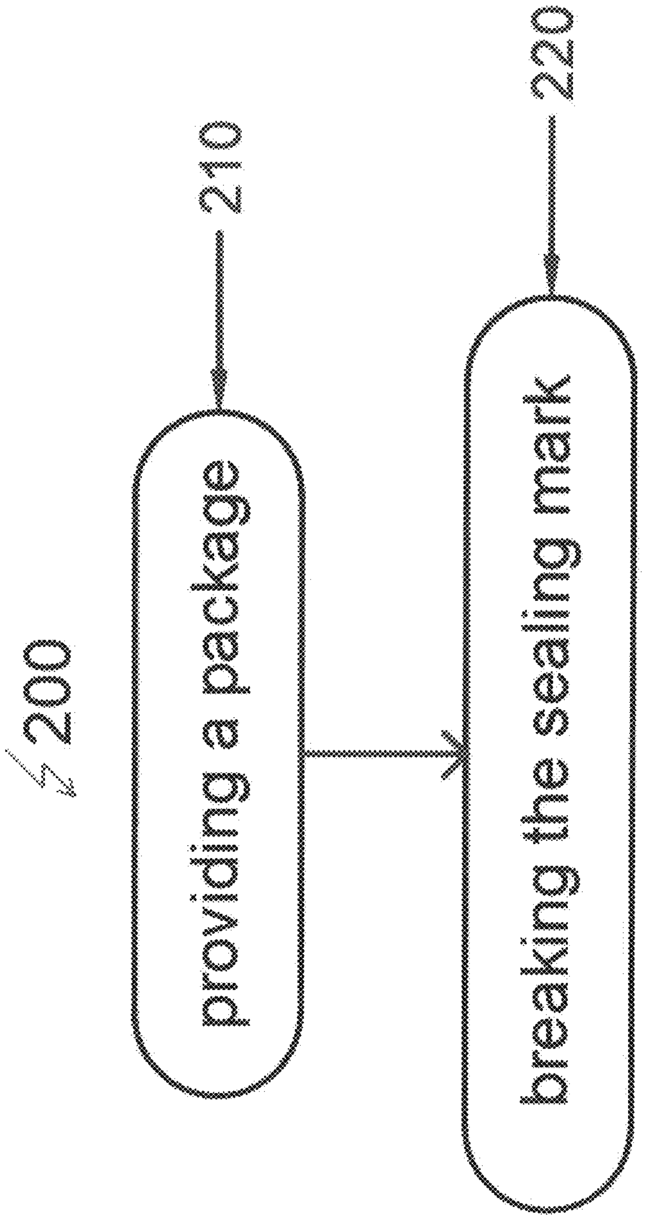
FIG. 6 shows a flow chart of a method of unsealing a package according to the invention.

FIG. 6 shows a flow chart of a method 200 according to the invention. The method 200 is used for unsealing a package such as a package for packing a medicament. The method 200 comprises a step of providing 210 a package, and a step of breaking 220 the sealing mark of the package. The method 200 may be applied before opening the package 1 and/or removing an article from the package 1.

The invention is not restricted to the embodiments described herein. It will be understood that many variants are possible.

As an example, it is noted that instead of, or in addition to, the magnetically (de) activatable layer, further elements can be included, e.g., an RFID element.

It is noted that the sealing mark can be used for sealing a package, but also for sealing other structures, e.g., for sealing a shipping container or a door.

It is further noted that the package can be used for packing an article such as a medicament. However, the package can also be used for packing other articles, such as seeds, fruit, vegetables or other food, plant material or other organic material such as drinks e.g., drinking water.

It is additionally noted that the thermosensitive layer may not only be applied in a sealing mark according to claim 1, but also, more generally, in a sealing mark without hologram layer, i.e., in a sealing mark for sealing a package, the sealing mark comprising a sealing layer and a thermosensitive layer at least partly covering the sealing layer, wherein the thermosensitive layer includes a thermochromic ink.

These and other embodiments will be apparent for a person skilled in the art and are considered to fall within the scope of the invention as defined in the following claims. For the purpose of clarity and a concise description, features are described herein as part of the same or separate embodiments. However, it will be appreciated that the scope of the invention may include embodiments having combinations of all or some of the features described.

The invention claimed is:

1. A sealing mark for sealing a package, the sealing mark comprising a sealing layer and a hologram layer at least partly covering the sealing layer, the sealing mark further comprising a thermosensitive layer at least partly covering the hologram layer and/or the sealing layer and a perforation line to be aligned with a closing structure of the package to be sealed, wherein the thermosensitive layer includes thermochromic ink, wherein the thermochromic ink is irreversible, wherein the thermochromic ink is selected to change color upon reaching a predetermined temperature level and wherein the color change is permanent.

2. A sealing mark according to claim 1, wherein the pre-determined temperature level is 35 degrees Celsius.

3. A sealing mark according to claim 1, wherein the thermosensitive layer is manufactured on the hologram layer using at least one of: a printing process, a stamping process, a laser process, an engraving process and a depositing process.

4. A sealing mark according to claim 1, wherein the hologram layer includes optically readable elements.

5. A sealing mark according to claim 4, wherein the optically readable elements have been encoded.

6. A sealing mark according to claim 1, further including an RFID element and/or a magnetically de-activatable security or information element.

7. A sealing mark according to claim 1, further including an intermediate glue layer sandwiched between the thermosensitive layer and the hologram layer and/or the sealing layer.

8. A sealing mark according to claim 1, wherein the thermosensitive layer is located on top of the hologram layer.

9. A package for packing an article, the package being sealed using a sealing mark comprising a sealing layer and a hologram layer at least partly covering the sealing layer, the sealing mark further comprising a thermosensitive layer at least partly covering the hologram layer and/or the sealing layer, wherein the thermosensitive layer includes thermochromic ink, wherein the thermochromic ink is irreversible, wherein the thermochromic ink is selected to change color upon reaching a predetermined temperature level and wherein the color change is permanent, said package further comprising a closing structure that is at least partly sealed by the sealing mark.

10. A package according to claim 9, manufactured from a paper material and/or plastic material, wherein the sealing mark is attached to the paper material and/or plastic material.

11. A package according to claim 10, further comprising an identification code printed on the paper and/or plastic material or the sealing mark.

12. A package according to claim 9, comprising a single or a multiple number of additional closing structures that are also at least partly sealed by a sealing mark as defined in claim 9.

13. A method of unsealing a package, comprising a step of providing a package according to claim 11, and a step of breaking the sealing mark of the package.

14. The package according to claim 9, wherein the article is a medicament.

15. A method of sealing a package, comprising a step of providing a package for packaging an article and a step of sealing the package using a sealing mark according to claim 1.

16. The method according to claim 15, wherein the article is a medicine.

* * * * *